United States Patent [19]

Buckshaw et al.

[11] Patent Number: 5,243,875
[45] Date of Patent: Sep. 14, 1993

[54] CONTROL DEVICE, PARTS THEREFOR AND METHODS OF MAKING THE SAME

[75] Inventors: Thomas M. Buckshaw, Indiana; David D. Martin, Dunbar, both of Pa.

[73] Assignee: Robertshaw Controls Company, Richmond, Va.

[21] Appl. No.: 997,342

[22] Filed: Dec. 28, 1992

Related U.S. Application Data

[62] Division of Ser. No. 790,594, Nov. 8, 1991, Pat. No. 5,193,411.

[51] Int. Cl.⁵ ............................................. F16C 1/10
[52] U.S. Cl. .................................... 74/502.4; 74/502.6
[58] Field of Search ... 74/502.4, 502.5, 502.6/501.5 R, 74/502, 503; 24/115 A, 134

[56] References Cited

U.S. PATENT DOCUMENTS

| | | | |
|---|---|---|---|
| 2,905,178 | 9/1959 | Hilzinger | 74/502 X |
| 4,141,117 | 2/1979 | Van Gompel | 74/502.4 X |
| 4,304,148 | 12/1981 | Hamman | 74/502.4 |
| 4,368,910 | 1/1983 | Fidrych | 24/115 |
| 4,647,726 | 3/1987 | Blum | 24/115 A |
| 4,787,263 | 11/1988 | Jaksic | 74/502.4 X |
| 4,955,252 | 9/1990 | Clissett et al. | 74/502.4 |
| 5,002,315 | 3/1991 | Bartholomew | 74/502.4 X |
| 5,003,672 | 4/1991 | Randall | 24/136 R X |
| 5,015,023 | 5/1991 | Hall | 74/502.4 X |
| 5,018,251 | 5/1991 | Brown | 74/502.4 X |
| 5,020,389 | 6/1991 | Sigler | 74/553 |
| 5,156,064 | 10/1992 | Truman | 74/501.5 R |
| 5,193,411 | 3/1993 | Buckshaw et al. | 74/502.4 |
| 5,199,321 | 4/1993 | Nowak | 74/501.5 R |

FOREIGN PATENT DOCUMENTS 683128  10/1939  Fed. Rep. of Germany ..... 74/502.5

Primary Examiner—Vinh T. Luong
Attorney, Agent, or Firm—Candor, Candor & Tassone

[57] ABSTRACT

A control device, parts therefor and methods of making the same are provided, the control device comprising a housing having an external peripheral surface, a control unit disposed in the housing, a bulb disposed external to the housing and remote therefrom, a capillary tube interconnecting the bulb to the control unit, fastening structure securing a part of the capillary tube to the external peripheral surface of the housing, and a sleeve of material telescoped on the capillary tube and having opposed ends one of which is disposed adjacent the fastening structure and the other of which is located between the bulb and the one of the ends thereof, one of the capillary tube and the fastening structure comprising expanding structure that outwardly expanded the one of the ends of the sleeve after the one of the ends of the sleeve had been forced onto at least part of the expanding structure so that the one of the ends of the sleeve is held on the expanding structure.

5 Claims, 4 Drawing Sheets

CONTROL DEVICE, PARTS THEREFOR AND METHODS OF MAKING THE SAME

CROSS REFERENCE TO RELATED APPLICATION

This application is a divisional patent application of its copending parent patent application, Ser. No. 790,594, filed Nov. 8, 1991, now U.S. Pat. No. 5,193,411 issued on Mar. 16, 1993.

BACKGROUND OF THE INVENTION

1. Field of the Invention

This invention relates to a new control device and to new parts therefor for securing a tubular sleeve on an external portion of a capillary tube of the control device as well as to new methods of making such a control device and such parts.

2. Prior Art Statement

It is known to provide a control device comprising a housing means having an external peripheral surface means, control means disposed in the housing means, a bulb means disposed external to the housing means and remote therefrom, a capillary tube interconnecting the bulb means to the control means, fastening means securing a part of the capillary tube to the external peripheral surface means of the housing means, and a sleeve of material disposed on the capillary tube and having opposed ends one of which is disposed adjacent the fastening means and the other of which is located between the bulb means and the one of the ends thereof. For example, see FIGS. 1 and 2 of this application.

SUMMARY OF THE INVENTION

It is one of the features of this invention to provide a new control device wherein the capillary sleeving is uniquely secured in place on an external portion of the capillary tube of the control device without utilizing a prior known taping operation.

In particular, it is known to dispose an end of a sleeve of material adjacent a fastening means of a control device that fastens a part of the capillary tube to an external peripheral surface of the housing of the control device and then utilizing a self-adhering strip of tape to secure that end of the sleeve of material to the capillary tube by winding the tape first on the capillary tube and then onto the end of the sleeve.

In this manner, the sleeve of material is held in the desired telescoped position on the external portion of the capillary tube between the housing of the control device and a bulb means interconnected to a remote end of that capillary tube, such sleeve being formed of any suitable material, such as plastic, woven fiberglass, etc. and being utilized to thermally or electrically insulate and/or protect from wear the thus covered portion of the capillary tube when the control device is subsequently disposed in an appliance for thermostatic purposes in a manner well known in the art. For example, see the U.S. Pat. to Sigler, No. 5,020,389 for a disclosure of the various parts of such a control device whereby this U.S. patent is being incorporated into this disclosure by this reference thereto.

However, the prior known taping operation to secure the sleeve of material on the capillary tube of such a control device is a costly and time consuming operation.

Therefore, it was found according to the teachings of this invention that either the capillary tube or the fastening means therefor can comprise an expanding means that will outwardly expand one of the ends of the sleeve of material as that one of the ends of the sleeve of material is being forced onto the expanding means so that the expanding means will hold that one of the ends of the sleeve in place without requiring a subsequent taping operation.

For example, one embodiment of this invention comprises a control device comprising a housing means having an external peripheral surface means, control means disposed in the housing means, a bulb means disposed external to the housing means and remote therefrom, a capillary tube interconnecting the bulb means to the control means, fastening means securing a part of the capillary tube to the external peripheral surface means of the housing means, and a sleeve of material telescoped on the capillary tube and having opposed ends one of which is disposed adjacent the fastening means and the other of which is located between the bulb means and the one of the ends thereof, one of the capillary tube and the fastening means comprising expanding means that outwardly expanded the one of the ends of the sleeve after the one of the ends of the sleeve had been forced onto at least part of the expanding means so that the one of the ends of the sleeve is held on the expanding means.

Accordingly, it is an object of this invention to provide a new control device having one or more of the novel features of this invention as set forth above or hereinafter shown or described.

Another object of this invention is to provide a new method of making such a control device, the method of this invention having one or more of the novel features of this invention as set forth above or hereinafter shown or described.

Another object of this invention is to provide a new part for such a control device, the new part of this invention having one or more of the novel features of this invention as set forth above or hereinafter shown or described.

Another object of this invention is to provide a new method of making such a new part, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
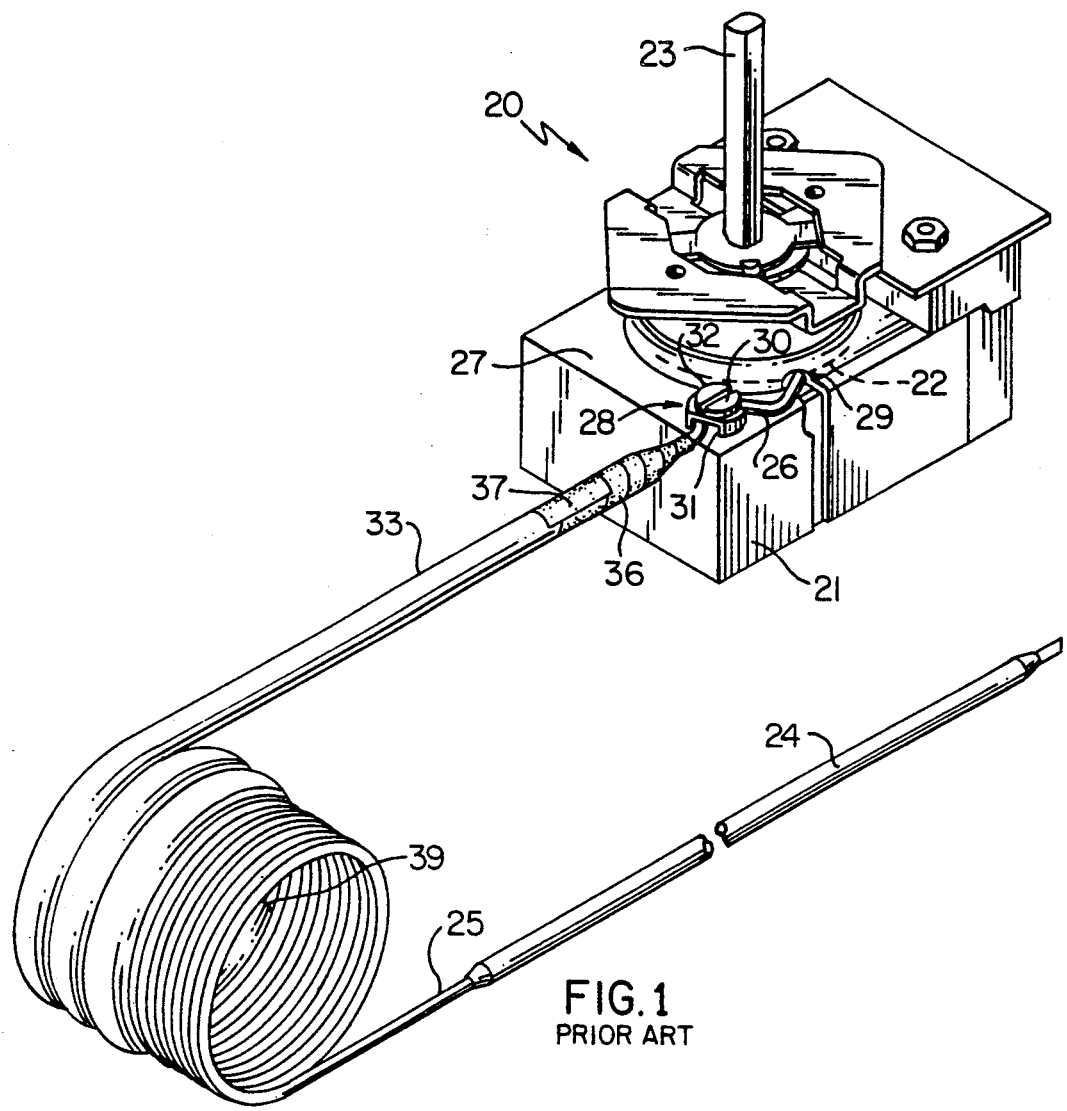
FIG. 1 a perspective view illustrating a prior known control device having the one end of the capillary sleeve of material held in position on the capillary tube by a self-adhering strip of tape.

While the various features of this invention are hereinafter illustrated and described as being particularly adapted to provide a unique means for securing a sleeve of material onto a capillary tube of a control device of a particular type, it is to be understood that the various features of this invention can be utilized singly or in various combinations thereof to provide a securing means for a control device of another type, as desired.

Therefore, this invention is not to be limited to only the embodiments illustrated in the drawings, because the drawings are merely utilized to illustrate some of the wide variety of uses of this invention.

Figure 2:
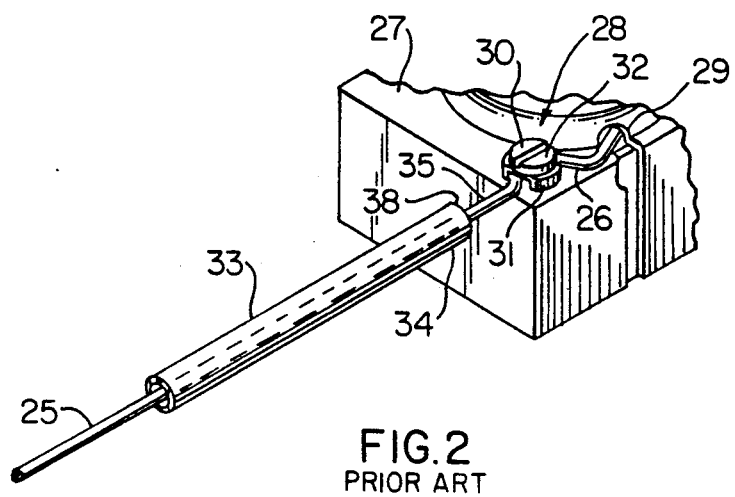
FIG. 2 is a fragmentary view similar to FIG. 1 and illustrates how the end of the sleeve of material is positioned on the capillary tube before the taping operation.

Referring now to FIGS. 1 and 2, a prior known control device is generally indicated by the reference numeral 20 and comprises a housing means 21 having a control means 22 disposed therein, the control means 22 comprising a diaphragm arrangement that is adapted to operate an electrical switch means to one condition thereof when a temperature is sensed by the control device 20 that is at or above a set temperature that has been selected by a selector shaft 23 movably carried by the housing means 21 all in a manner well known in the art. For example, see the aforementioned U.S. Pat. to Sliger, No. 5,020,389, whereby a further discussion of the control means 22 and the operation of the control device 20 is deemed unnecessary so that only the details of the control device 20 necessary to understand the features of this invention will be hereinafter set forth.

The control means 22 of the control device 20 is interconnected to a bulb means 24 by a capillary tube 25 that has a part 26 thereof secured to an external peripheral surface means 27 of the housing means 21 by a fastening means that is generally indicated by the reference numeral 28 so that the part or portion 26 can extend into the housing means 21 through an opening means 29 thereof to interconnect with the control means 22 all in a manner well known in the art.

In this manner, a suitable fluid in the bulb 24 expands and contracts in relation to the temperature of the medium adjacent the bulb means 24 so as to cause the operation of the control means 22 in relation to such sensed temperature as previously set forth and all in a manner well known in the art.

The fastening means 28 comprises a threaded fastening member 30 that secures a clamp 31 against the surface means 27 of the housing means 21 by having a threaded portion (not shown) of the fastening member 30 threaded into a threaded opening (not shown) in the housing means 21 to capture the clamp 31 between an enlarged head 32 of the fastening member 30 and the surface means 27 so that the part or portion 26 of the capillary tube 25 is held against the surface means 27 by the clamp 31 and will not subject the portion 26 of the capillary tube 25 that is interconnected to the control means 22 from being pulled relative thereto when the capillary tube 25 external to the clamp 31 is pulled relative to the housing means 21.

In order to protect the capillary tube 25 from a point adjacent the fastening means 28 to a point located anywhere toward the bulb means 24 for the reasons previously set forth, a sleeve 33 of any suitable material is telescoped onto the capillary tube 25 such as by having a leading end 34 thereof slipped over the bulb means 24 and then threaded over the capillary tube 25 until the end 34 is positioned adjacent the fastening means 28 in the manner illustrated in FIG. 2 whereby a section 35 of the capillary tube 25 remains exposed between the end 34 of the sleeve 33 and the fastening means 28. With the sleeve 25 having the end 34 held in the position illustrated in FIG. 2, an assembler utilizes a strip 36 of any suitable self-adhering tape by first contacting an end of the strip 36 against the section 35 of the capillary tube 25 and then winding the strip 36 in a coiled manner onto the end 34 of the sleeve 33 as illustrated in FIG. 1 so that the trailing end 37 of the tape 36 is secured onto the sleeve 33 a desired distance down from an end edge 38 of the end 34 of the sleeve 25 so as to hold the sleeve 33 in the position illustrated in FIG. 1 for the purpose of protecting the capillary tube 25 throughout the desired length thereof wherein the other end 39 of the sleeve 33 is disposed the desired distance from the bulb means 24 or at the bulb means 24, as desired.

As previously stated, the taping operation for securing the end 34 of the sleeve 33 in place with the strip 36 of self-adhering tape is a costly and time-consuming operation which is completely eliminated when making a new control device of this invention.

Figure 3:
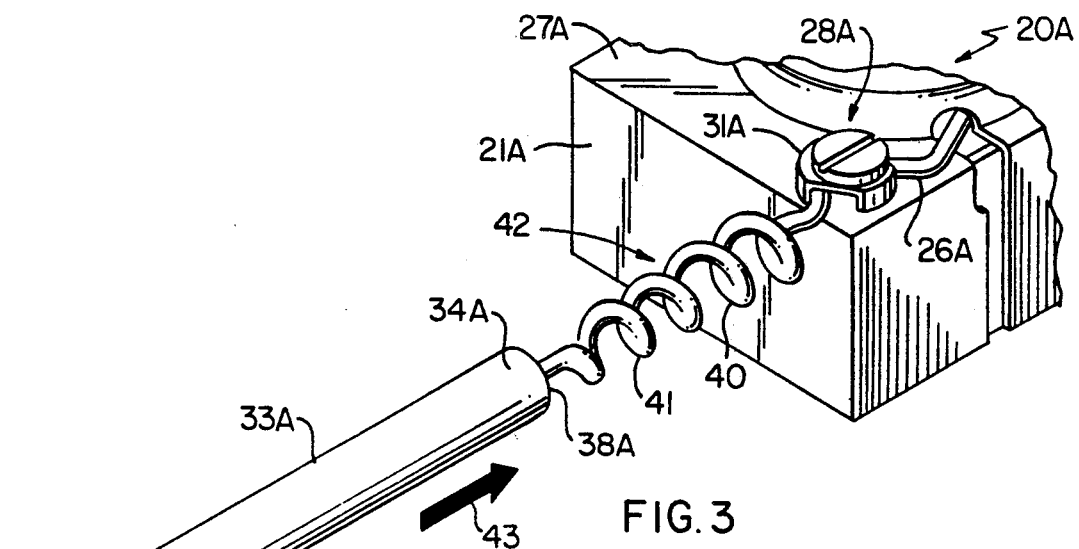
FIG. 3 is a view similar to FIG. 2 and illustrates one of the steps in the method of this invention in making one of the new control devices of this invention that is illustrated in FIG. 5.
Figure 4:
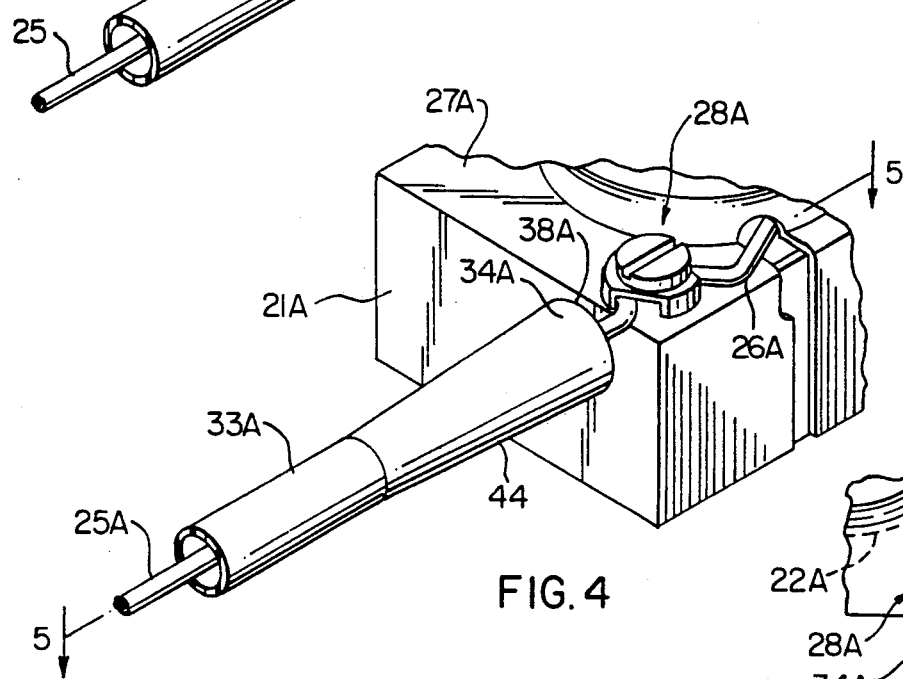
FIG. 4 is a view similar to FIG. 3 and illustrates another step in the method of this invention for making the control device of FIG. 5.
Figure 5:
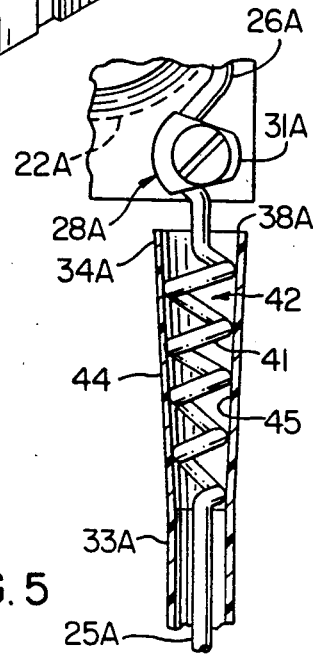
FIG. 5 is a fragmentary cross-sectional view taken on line 5—5 of FIG. 4 and illustrates one of the new control devices of this invention.

In particular, a new control device of this invention is generally indicated by the reference numeral 20A in FIGS. 3–5 and the parts thereof that are similar to the parts of the control device 20 previously described are indicated by like reference numerals followed by the reference letter "A".

As illustrated in FIGS. 3–5, the control device 20A comprises the housing means 21A having the control means 22A therein and having the part 26A of the capillary tube 25A secured to the external peripheral surface means 27A by the fastening means 28A in the manner previously described.

However, the capillary tube 25A of this invention has a section 40 adjacent the fastening means 28A which is longitudinally coiled to define a plurality of coils 41 disposed in spaced apart and aligned relation and having the coils 41 increase in diameter as the coils 41 approach the fastening means 28A so that the coiled section 40 defines a generally conical expanding means that is generally indicated by the reference numeral 42 in FIGS. 3–5.

By having the expanding means 42 of the proper dimensions through the forming of the coils 41, the end 34A of the sleeve 33A, when being axially moved from the telescoped position illustrated in FIG. 3 to the position illustrated in FIG. 4 as represented by the directional arrow 43 in FIG. 3, is radially outwardly expanded to define a substantially frustro-conical portion 44 that is forced onto the coils 41 as illustrated in FIG. 5 so as to be held on the expanding means 42 by the internal peripheral surface means 45 of the portion 44 of the sleeve 33A frictionally engaging the coils 41 once the end edge 38A of the end 34A of the sleeve 33A is disposed closely adjacent the fastening means 28A in the desired position thereof as illustrated in FIGS. 4 and 5.

In order to assist in the forcing of the end 34A of the sleeve 33A onto the conically shaped expanding means 42, not only is the end 34A of the sleeve 33A axially moved toward the housing means 21A from the position illustrated in FIG. 3 to the position illustrated in FIG. 4, but also the end 34A can be rotated relative to the capillary tube 25A with a firm twisting or threading motion to augment the axial movement thereof during the expanding of the part 44 of the sleeve 34A on the expanding means 42.

Therefore, it can be seen that it is a relatively simple method of this invention to fasten the end 34A of the sleeve 33A in the desired assembled position relative to the housing means 21A by merely forcing the end 34A of the sleeve 33A axially onto at least a part of the expanding portion means 42 with a simple and non-time-consuming motion until the end edge 38A is disposed in the position illustrated in FIGS. 4 and 5 whereby the expanded portion 44 of the sleeve 33A is held by friction on the coils 41 in the assembled relationship illustrated in FIGS. 4 and 5 without requiring a subsequent prior known taping operation as set forth in FIGS. 1 and 2.

Thus, it can be seen that the capillary tubes 25A of this invention can each be precoiled by suitable apparatus and when subsequently assembled to a housing means 21A will permit its associated sleeve 33A to be assembled therewith by the previously described method of this invention in a simple and effective manner. Of course, the coiled section 40 could be formed after the capillary tube 25A has been assembled to the housing means 21A, if desired, and such coiled section 40 could be formed by hand or by suitable apparatus as desired.

While the expanding means 42 of the capillary tube 25A of FIGS. 3-5 define a generally conical configuration, it is to be understood that the coils 41 could define other configurations that will still provide an expanding function for holding the end 34A of the sleeve 33A thereon.

Figure 6:
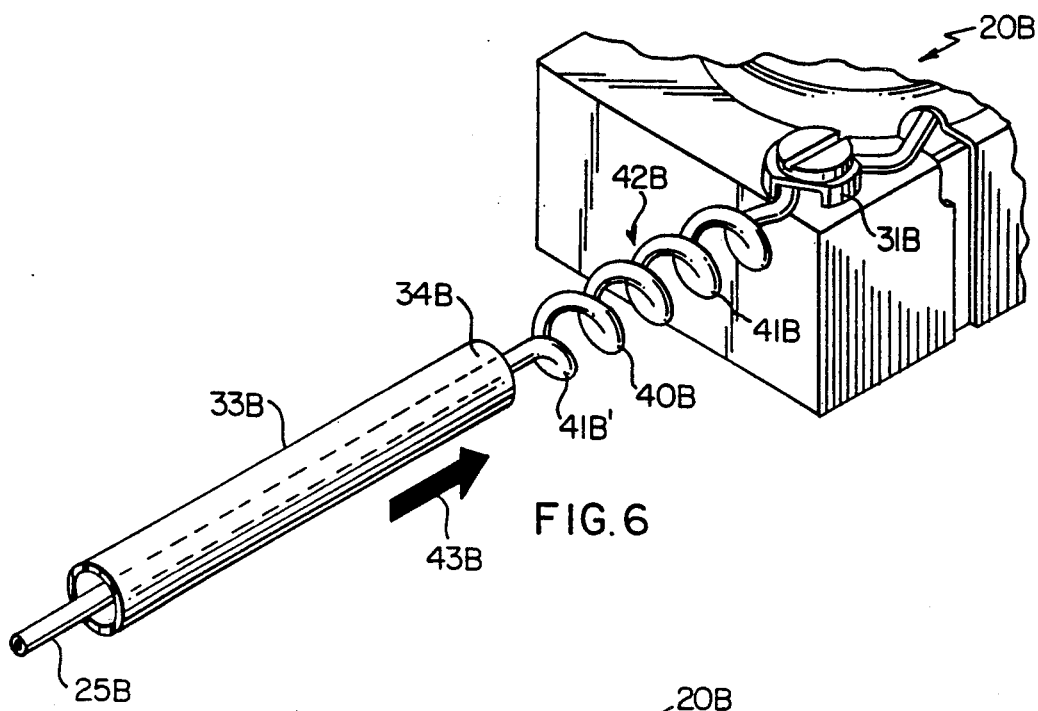
FIG. 6 is a view similar to FIG. 3 and illustrates one step in the method of this invention for making a new control device of this invention that is illustrated in FIG. 8.
Figure 7:
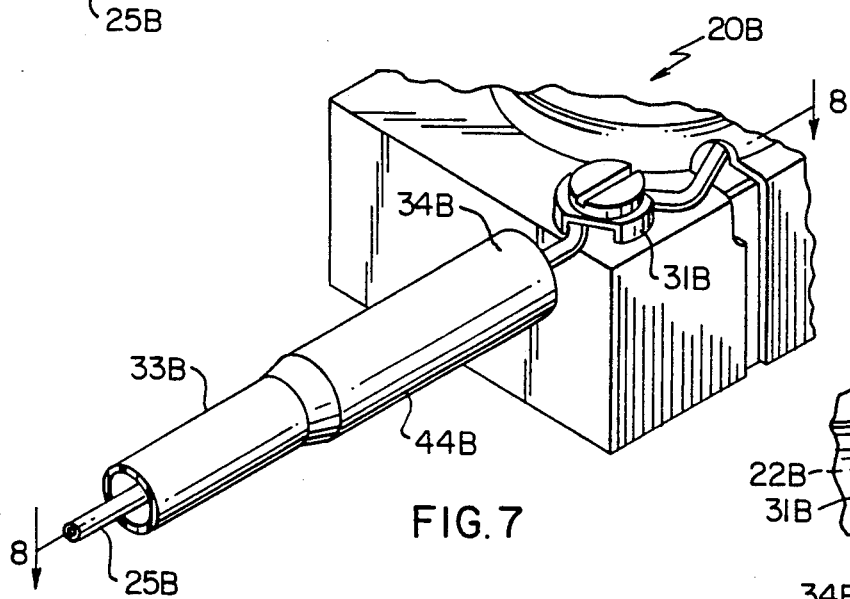
FIG. 7 is a view similar to FIG. 6 and illustrates another step in the method of making the new control device of FIG. 8.
Figure 8:
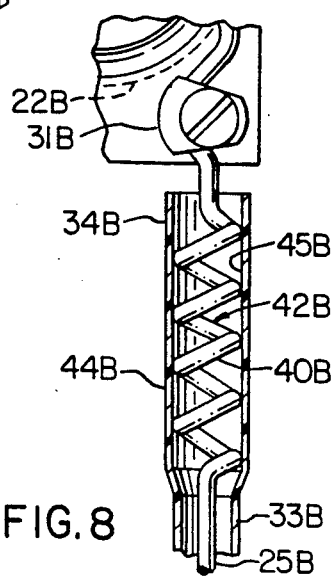
FIG. 8 is a fragmentary cross-sectional view taken on line 8—8 of FIG. 7 and illustrates another new control device of this invention.

For example, reference is now made to FIGS. 6-8 wherein another new control device of this invention is generally indicated by the reference numeral 20B and parts thereof similar to the parts of the control devices 20 and 20A previously described are indicated by like reference numerals followed by the reference letter "B".

As illustrated in FIGS. 6-8, the control device 20B of this invention is substantially the same as the control device 20A previously described except that the expanding means 42B of the capillary tube 25B has the coiled section 40B defining a generally cylindrical configuration as the individual coils 41B thereof are substantially of the same size even though the same are longitudinally coiled in the spaced apart and aligned relation as illustrated.

Nevertheless, when the end 34B of the sleeve is moved axially in the direction illustrated by the directional arrow 43B from the position illustrated in FIG. 6 to the position illustrated in FIG. 7, with or without the previously described twisting motion, the expanding means 42B that is, in effect, forced inside the tube 33B at the end 34B thereof radially outwardly expands the sleeve 33B to define a substantially cylindrically shaped expanded portion 44B that will be held in the assembled position illustrated in FIGS. 7 and 8 by the friction created between the coils 41B and the internal peripheral surface means 45B of the sleeve 33B as illustrated in FIG. 8, the first coil 41B' of the expanding section 42B being smaller in diameter than the other coil 41B so as to assist in the initial insertion of the end 34B onto the expanding section 42B as illustrated.

Thus, it can be seen that the capillary tube 25B of the control device 20B can have the coiled section 40B formed therein by suitable apparatus to readily permit the sleeve 33B to be subsequently disposed thereon in the same manner as the sleeve 33A previously described.

While the control devices 20A and 20B of this invention each has the expanding means 42A and 42B forming part of the capillary means 25A and 25B thereof, it is to be understood that other expanding means can be utilized to function in a similar manner.

For example, another control device of this invention is generally indicated by the reference numeral 20C in FIGS. 9-12 and parts thereof similar to the parts of the control devices 20, 20A and 20B previously described are indicated by like reference numerals followed by the reference letter "C".

As illustrated in FIGS. 9-12, the housing means 21C of the control device 20C is formed in the same manner as the housing means 21, 21A and 21B previously described but the clamp 32, 32A or 32B is not utilized to form the fastening means 28C as in place thereof a new clamping member 46 of this invention is utilized and is secured to the surface means 27C of the housing means 21C by the previously described fastening member 30C.

Figure 12:
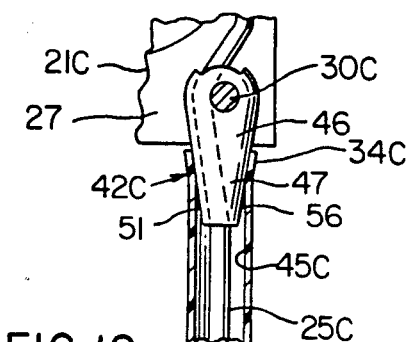
FIG. 12 is a fragmentary cross-sectional view taken on line 12—12 of FIG. 10.
Figure 11:
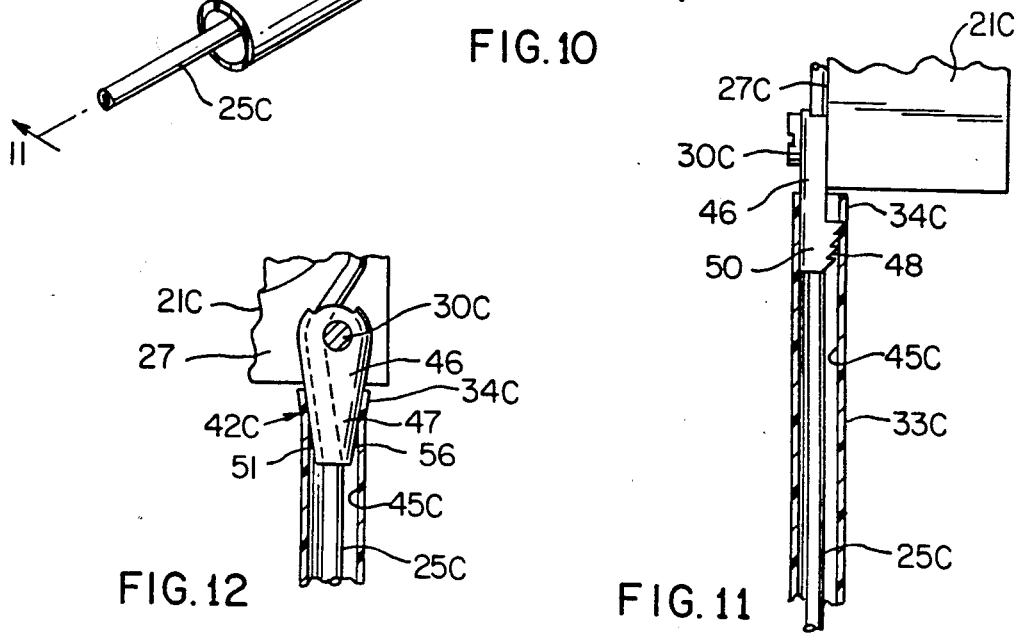
FIG. 11 is a fragmentary cross-sectional view taken on line 11—11 of FIG. 10 and illustrates another new control device of this invention.

The new clamping member or clamp 46 has a portion 47 that defines a configuration that comprises the expanding means 42C for radially outwardly expanding the end 34C of the sleeve 33C as the end 34C is axially moved onto the expanding portion 47, with or without the previously described twisting motion, in the manner illustrated in FIGS. 11 and 12, such expanding portion 47 being a generally conical configuration and having external barbs 48 that also tend to dig into the internal peripheral surface 45C of the sleeve 33C as the same is forced onto the expanding portion 47 as illustrated in FIG. 12.

Figure 9:
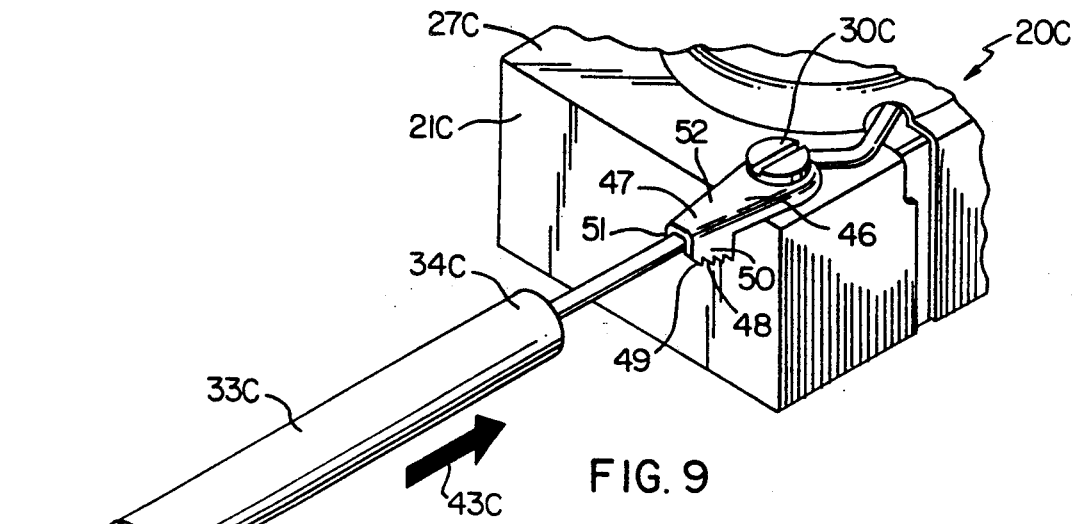
FIG. 9 is a view similar to FIG. 6 and illustrates one step in the method of this invention for making a new control device of this invention that is illustrated in FIGS. 11 and 12.
Figure 10:
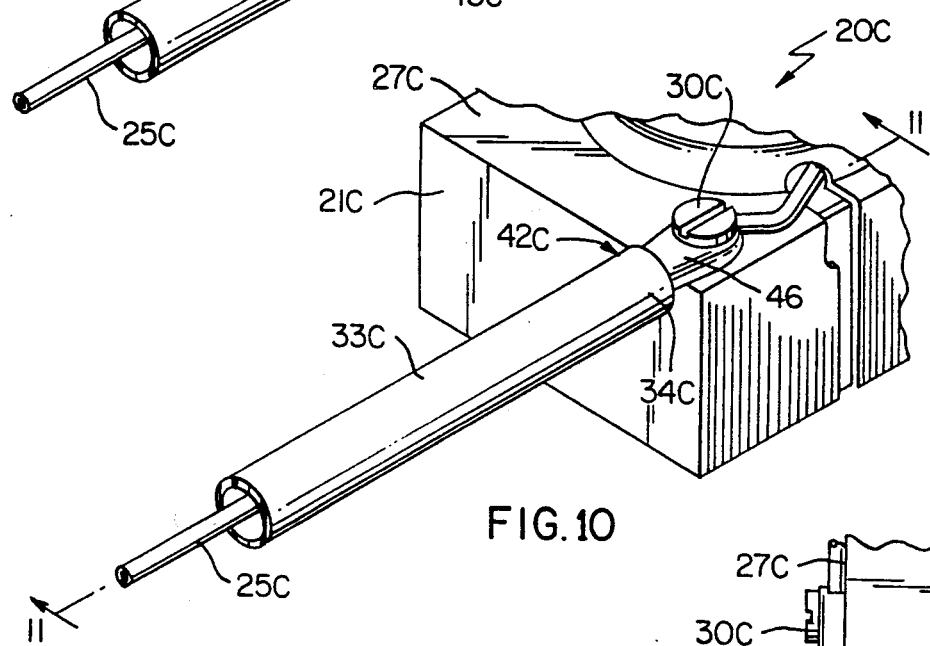
FIG. 10 a view similar to FIG. 9 and illustrates another step of the method of this invention for forming the new control device of FIGS. 11 and 12.

In particular, the barbs 48 are formed along free edges 49 of a pair of legs 50 and 51 that extend from a front portion 52 of the clamp 46 in spaced apart and angled relation so as to be disposed on opposite sides of the capillary tube 25C in the manner illustrated in FIG. 9. Thus, the capillary tube 25C can be snaked around the fastening member 30C adjacent one of the legs 50 or 51 as illustrated by phantom lines in FIG. 11 and thereby be held by the clamping member 46 against the surface 27C of the housing means 21C in the same manner as the clamps 31, 31A and 31B previously described while permitting the sleeve 33C to have the end 34C thereof radially outwardly expanded by the expanding portion 47 to hold the sleeve 33C in its assembled relation in the manner illustrated in FIGS. 10-12.

Thus, it can be seen that it is a relatively simple method of this invention to make the control device 20C of FIGS. 9-12 by first forming the clamp 46 out of any suitable material, such as metallic material, to be fastened to the housing means 21C by the fastening member 30C as its legs 50 and 51 are straddling the capillary tube 25C in the manner illustrated in FIG. 9 so that the end 34C of the sleeve 33C can be subsequently moved in the direction of the directional arrow 43C of FIG. 9 onto the expanding portion 47 of the clip 46 and have the end 34C radially outwardly expanded so as to be held by friction on the expanding portion 47 as well as to be held by the barbs 48 digging into the internal peripheral surface 45C of the end 34C of the sleeve 33C in the manner illustrated in the drawings.

Thus, it can be seen that the control devices of this invention each has an expanding means with that expanding means either being part of the capillary tube or part of the fastening means for the capillary tube for readily securing the protective sleeve in its assembled position without requiring a costly and time-consuming taping operation for the reasons previously set forth.

Thus, it can be seen that this invention not only provides a new control device and a new method of making the same, but also this invention provides a new part for such a control device and a new method of making such a new part.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a control device comprising a housing means having an external peripheral surface means, control means disposed in said housing means, a bulb means disposed external to said housing means and remote therefrom, a capillary tube interconnecting said bulb means to said control means, fastening means securing a part of said capillary tube to said external peripheral surface means of said housing means, and a sleeve of material telescoped on said capillary tube and having opposed ends one of which is disposed adjacent said fastening means and the other of which is located between said bulb means and said one of said ends thereof, the improvement wherein said fastening means itself has a part thereof that comprises an expanding means that outwardly expanded said one of said ends of said sleeve after said one of said ends of said sleeve had been forced onto at least part of said expanding means so that said one of said ends of said sleeve is held on said expanding means.

2. A control device as set forth in claim 1 wherein said expanding means comprises barb means frictionally engaging said one of said ends of said sleeve.

3. A control device as set forth in claim 1 wherein said part of said fastening means has a tapering portion that extends along said capillary tube, said tapering portion having opposed ends one of which is smaller than the other of said ends and is the end that is first received in said one of said ends of said sleeve.

4. A control device as set forth in claim 3 wherein said part of said fastening means has barb means frictionally engaging said one of said ends of said sleeve.

5. In a fastening means for a control device comprising a housing means having an external peripheral surface means, control means disposed in said housing means, a bulb means disposed external to said housing means and remote therefrom, a capillary tube interconnecting said bulb means to said control means, said fastening means being adapted to secure a part of said capillary tube to said external peripheral surface means of said housing means, and a sleeve of material for being telescoped on said capillary tube and having opposed ends one of which is adapted be disposed adjacent said fastening means and to the other of which is adapted to be located between said bulb means and said one of said ends thereof, the improvement wherein said fastening means itself has a part thereof that comprises an expanding means that will outwardly expand said one of said ends of said sleeve after said one of said ends of said sleeve has been forced onto at least part of said expanding means so that said one of said ends of said sleeve will be held on said expanding means.

* * * * *